United States Patent [19]
Ruvin

[11] 3,866,227
[45] Feb. 11, 1975

[54] DOPPLER TRACKER RECEIVER

[75] Inventor: Abraham Eli Ruvin, Cherry Hill, N.J.

[73] Assignee: RCA Corporation, New York, N.Y.

[22] Filed: Mar. 15, 1973

[21] Appl. No.: 341,779

[52] U.S. Cl............................ 343/106 D, 343/108 M
[51] Int. Cl.............................................. G01s 1/38
[58] Field of Search.................... 343/108 M, 106 D

[56] References Cited
UNITED STATES PATENTS
3,774,212  11/1973  Eckert et al..................... 343/108 M Primary Examiner—Richard A. Farley
Assistant Examiner—Richard E. Berger
Attorney, Agent, or Firm—George J. Seligsohn; Edward J. Norton

[57] ABSTRACT

A doppler tracker suitable for use as an airborne receiver in a doppler scan microwave landing system. The tracker derives a tracking error signal for a phase-locked VCO which employs a phase-locked loop incorporating two parallel integrator channels coupled to a sample and hold circuit in a manner that makes the doppler tracker sense the phase history of the received signal during the doppler scans, while ignoring the phase discontinuities which occur between scans. This avoids granularity in the doppler frequency measurement.

8 Claims, 13 Drawing Figures

PARALLEL-PHASE DOPPLER TRACKER RECEIVER 400

MICROWAVE LANDING SYSTEM
Fig. 1.

DOPPLER TRACKER TRANSMITTER
Fig. 2

Fig. 3.

(f) INTEGRATED OVER EACH SCAN

Fig. 5g.

(e) AND (g) MULTIPLIED, SAMPLED AT THE END OF EACH SCAN, AND HELD

Fig. 5h.

L-P FILTERED ERROR SIGNAL TO VCO

SIGNAL AND VCO PHASE VS TIME DIAGRAM

Fig. 5b.

SIGNAL AND VCO VECTOR DIAGRAM

Fig. 5c.

VCO PHASE DETECTOR OUTPUT

Fig. 5d.

j VCO PHASE DETECTOR OUTPUT

VCO PHASE DETECTOR OUTPUT INTEGRATED OVER EACH SCAN

Fig. 5e.

j VCO PHASE DETECTOR WITH WEIGHING FROM SCAN SYNCHRONIZED OSCILLATOR

Fig. 5f.

DOPPLER TRACKER RECEIVER

This invention relates to doppler tracker receivers and, more particularly, to a relatively phase-insensitive doppler tracker receiver suitable for use as an airborne direction finder in a proposed microwave landing system for aircraft.

So-called "pseudodoppler" antenna arrays have been developed for transmitting a radio signal having a frequency which is a function of the angular orientation of any ray thereof with respect to a reference direction. Such a pseudodoppler antenna array normally comprises a linear array of a predetermined plural number of equally spaced elements. Commutating switch means are effective in periodically applying a signal of a given frequency from a transmitter through each of these elements in order. This results in a cyclic scan of the elements of the linear array in order from the first element thereof to the last element thereof with a flyback from the last element thereof to the first element thereof between successive forward scans.

During each forward scan, due to the doppler effect, the frequency of any ray transmitted from the linear array will differ from the applied transmitter signal frequency by an amount which is a function of the length of the linear array, the scanning period and the angle of that transmitted ray with respect to the normal to the linear array. Since the transmitter signal frequency, the scanning period and the length of the linear array have known, fixed values, such a pseudodoppler antenna array is capable of being employed as part of a direction-finding system which permits a remote airborne doppler tracker receiver to determine its angular orientation with respect to the reference direction of the linear pseudodoppler antenna array from the frequency which exists during each forward scan of the transmitted ray received by the remote airborne doppler tracker receiver.

However, during flyback between successive forward scans, an unwanted phase discontinuity or jump takes place. This unwanted phase jump causes the relatively long-term average value of the received frequency to change in discrete steps. This adds an unwanted "granularity" to the received frequency, which adversely affects the degree of precision with which direction can be determined.

The present invention is directed to an improved, relatively phase insensitive, doppler tracker receiver which, although not limited thereto, is useful in overcoming the problem of granularity and permits a more precise determination of direction from a signal transmitted from a pseudodoppler antenna array than otherwise would be the case.

This and other features and advantages of the present invention will become apparent from the following detailed description taken together with the accompanying drawing, in which.

Figure 1:
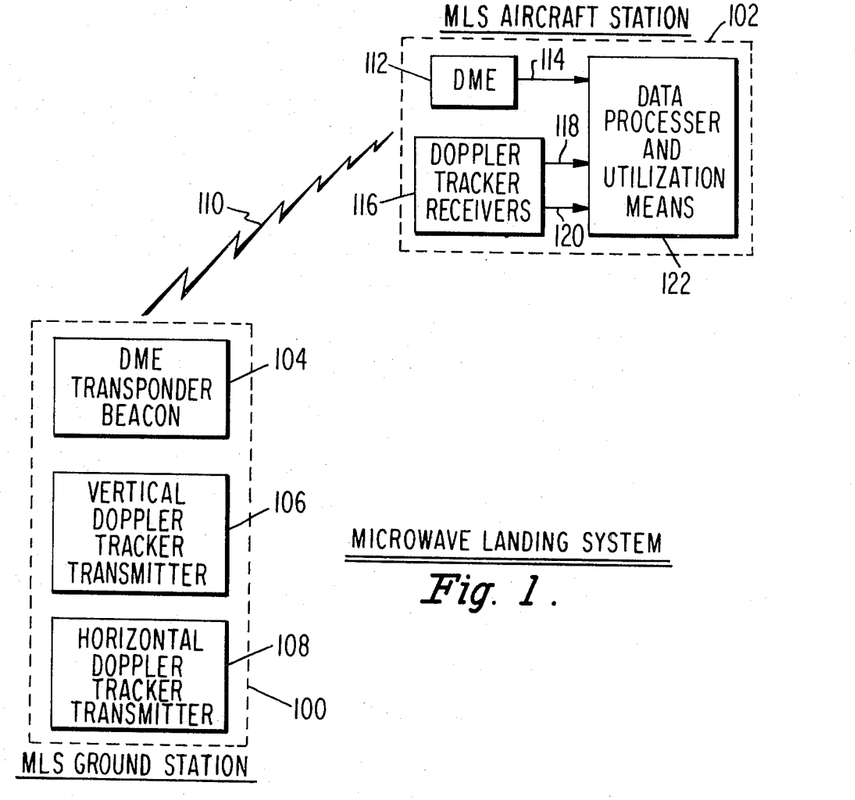
FIG. 1 is a block diagram of a proposed microwave landing system.

Referring now to FIG. 1, there is shown a ground station 100, associated with a particular runway of an airport, and an aircraft station 102, aboard a remote aircraft, which intends to land on this particular runway. Ground station 100 includes a DME (distance measuring equipment) transponder beacon 104, vertical doppler tracker transmitter 106 and horizontal doppler tracker transmitter 108. As indicated by line 110, the equipment included in ground station 100 is in radio contact with cooperating equipment of aircraft station 102 aboard the remote aircraft. In particular, DME 112 cooperates in a known manner with DME transponder beacon 104 to provide an output 114 from DME 112 having a value which continuously manifests the then-existing distance between the remote aircraft incorporating aircraft station 102 and the runway associated with ground station 100. Doppler tracker receivers 116 include a vertical receiver portion which cooperates with vertical doppler tracker transmitter 106 to provide an output 118, which has a value which continuously manifests the then-existing elevation angle between the aircraft incorporating aircraft station 102 and the runway with which ground station 100 is associated. Doppler tracker receivers 116 further includes a horizontal receiver portion cooperating with horizontal doppler tracker transmitter 108 to provide an output 120, which has a value which manifests the then-existing azimuth of the aircraft incorporating aircraft station 102 with respect to a reference direction parallel to the length of the runway with which ground station 100 is associated.

Outputs 114, 118 and 120 are coupled as information inputs to data processor and utilization means 122 of aircraft station 102. Data processor and utilization means 122 includes a computer responsive to the applied distance, elevation and azimuth information to continuously compute the then existing position of the aircraft with respect to the runway associated with ground station 100. Further, data processor utilization means includes means responsive to both this derived position information and glide-path information, which has been preprogrammed therein, to either instruct the pilot of the aircraft in real time how to control the aircraft to properly land it on the particular runway which ground station is associated or, in the alternative, to automatically land the aircraft on this particular runway. Since the microwave landing system, itself, is not part of the present invention, it will not be discussed herein in any further detail.

Figure 2:
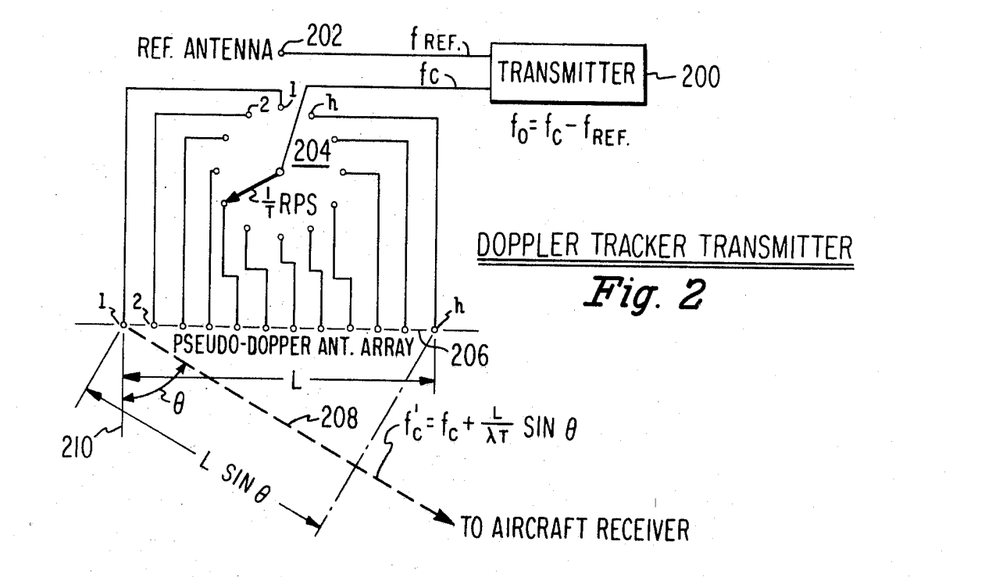
FIG. 2 is a schematic diagram of a doppler tracker transmitter of the microwave landing system shown in FIG. 1.

FIG. 2 shows a doppler tracker transmitter, incorporating a pseudodoppler antenna array, which may be employed as either vertical doppler tracker transmitter 106 or horizontal doppler tracker transmitter 108. The only important differences between transmitters 106 and 108 is that the pseudodoppler antenna array of vertical tracker transmitter 106 is oriented vertically, while the pseudodoppler antenna array of horizontal doppler tracker transmitter 108 is oriented horizontally in a direction normal to the length of the particular runway which horizontal doppler tracker transmitter 108 is associated and that the specific preselected values of operating parameters, such as wavelength, are different from each other.

The doppler tracker transmitter in FIG. 2 includes transmitter 200, which generates a reference-antenna signal at a first predetermined frequency $f_{REF}$ and a pseudodoppler antenna array signal at a predetermined carrier frequency $f_c$. As indicated in FIG. 2, the frequency $f_c$ and $f_{REF}$ differ from each other by a predetermined off-set frequency $f_o$.

As shown, the reference-antenna signal $f_{REF}$ is applied directly as an input to reference antenna 202. Carrier-frequency signal $f_c$ is applied by commutating switch 204 in sequence to each of linearly-disposed, equi-spaced, driven elements 1, 2 ... n of pseudodoppler antenna array 206. As shown in FIG. 2, the overall length of pseudodoppler antenna array 206, which extends from left-end element 1 thereof to right-end element n thereof, is L. Further, as indicated in FIG. 2, the wiper of commutating switch 204 rotates in a counter-clockwise direction at a rate of $1/T$ revolutions-per-second, where $T$ is the period in seconds of one revolution. Therefore, during each cycle of commutating switch 204, as the wiper thereof sequentially moves through contact 1, 2 ... n thereof, pseudodoppler antenna array 206 scans in a forward direction from driven element 1 thereof towards driven element n thereof. However, as the wiper of commutating switch 204 moves in a counter-clockwise direction from contact n thereof to contact 1 thereof, flyback occurs. This flyback happens in a short time interval between successive forward scans of pseudodoppler antenna array 206.

As indicated in FIG. 2, the actual frequency of $f_c'$ of a transmitted ray 208 is directed to a remote aircraft receiver from pseudodoppler antenna array 206 during a forward scan thereof depends upon the angle $\theta$ between ray 208 and the normal 210 to pseudodoppler array 206 in accordance with the following equation:

$$f_c' = f_c + L/\mu T \sin\theta; \quad (1)$$

where $f_c$ is the carrier frequency of the signal from transmitter 200 applied to pseudodoppler array 206, $L$ is the overall length of pseudodoppler antenna array 206, $\lambda$ is the radiated wavelength in space corresponding to carrier frequency $f_c$, and $T$ is the scan period of pseudodoppler antenna array 206.

The specific values of $f_{REF}$ and $f_c$ employed in the vertical doppler tracker transmitter are different from those employed in the horizontal doppler tracker transmitter. In addition, the selected values of T and L may be different for the vertical and horizontal doppler tracker transmitters, respectively. Further, transmitter 200 may modulate the signal $f_c$ and/or the signal $f_{REF}$ with a modulating signal which is synchronized with the rotation of commutating switch 204 in order to indicate the end of a forward scan and thereby the occurrence of a flyback at the end of each forward scan. However, such a modulating signal, although desirable, is not essential to the present invention.

Although each doppler tracker transmitter transmits to the aircraft receiver a pair of signals having respective frequencies corresponding to $f_{REF}$ and $f_c'$ shown in FIG. 2 and discussed above, the remote aircraft receiver does not receive signals having these transmitted frequencies, but frequencies which have been shifted therefrom. This results from the relative motion between the remote aircraft incorporating the doppler tracker receivers and the ground station incorporating the doppler tracker transmitters causing an unwanted actual doppler shift in both the signal from reference antenna 202 and the signal from pseudodoppler antenna array 206. However, since this unwanted actual doppler shift is essentially the same for both the transmitted reference antenna signal and the transmitted pseudodoppler antenna-array signal, it can be cancelled by subtracting the two received signals in the doppler tracker receiver to obtain a received off-set frequency $f_o'$ which is equal to the difference between $f_c'$ (defined by equation (1)) and $f_{REF}$. If, as shown in FIG. 2, $f_0$ equals $f_c - f_{REF}$, then:

$$f_0' = f_0 + L/\lambda T \sin\theta \quad (2)$$

Thus, the purpose of transmitting a reference frequency signal $f_{REF}$, along with the signal from pseudodoppler antenna array 206, is to eliminate at the remote receiver any actual doppler frequency shift due to the relative velocity of the remote aircraft with respect to the ground station. Since the values $f_0$, $L$, $\lambda$ and $T$ are all known constants, the derived value at $f_0'$ at the receiver is a measure of the angle $\theta$.

Figure 3:
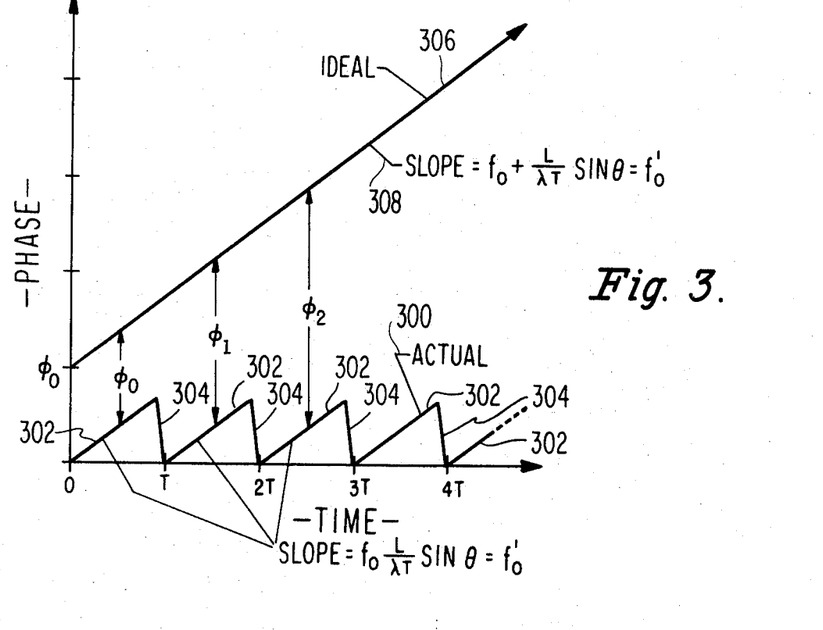
FIG. 3 is a graph helpful in explaining the problem with which the present invention is concerned.

As is known, frequency is proportional to the rate of change of phase with respect to time. FIG. 3 is a graph of phase with respect to time for both the actual received off-set frequency and an ideal off-set frequency which would exist if the transmitting pseudodoppler antenna array were of indefinite length and, therefore, not subject to flyback between successive forward scans. In particular, actual graph 300 comprises a periodic sawtooth wave having a period equal to $T$. Each wavelength of the sawtooth wave includes a relatively long positively-sloped linear portion 302, corresponding to the forward scan of the transmitting pseudodoppler antenna array, and a relatively short flyback portion 304. The positively-slopped linear portion 302 has a value equal to $f_o'$, as indicated in FIG. 3. The ideal graph 306 defines a single linear function having a slope 308 also equal to $f_o'$. The Y-intercept phase of ideal graph 306 is $\phi_o$.

Thus, all the positively-sloped portions 302 of actual graph 300 are parallel to each other and are also parallel to slope 308 of ideal graph 306. However, the phase difference between ideal graph 306 and actual graph 300 is not constant, but changes during each flyback period 304 of actual graph 300. As indicated in FIG. 3, the phase difference between ideal graph 306 and the positively-sloped portion 302 of each of the first three cycles $T_1$, $T_2$ and $T_3$ of actual graph 300 is $\phi_0$, $\phi_1$, and $\phi_2$, respectively. It is this change in phase which occurs during each flyback which causes the unwanted granularity in the off-set frequency derived at the doppler tracker receiver.

Figure 4:
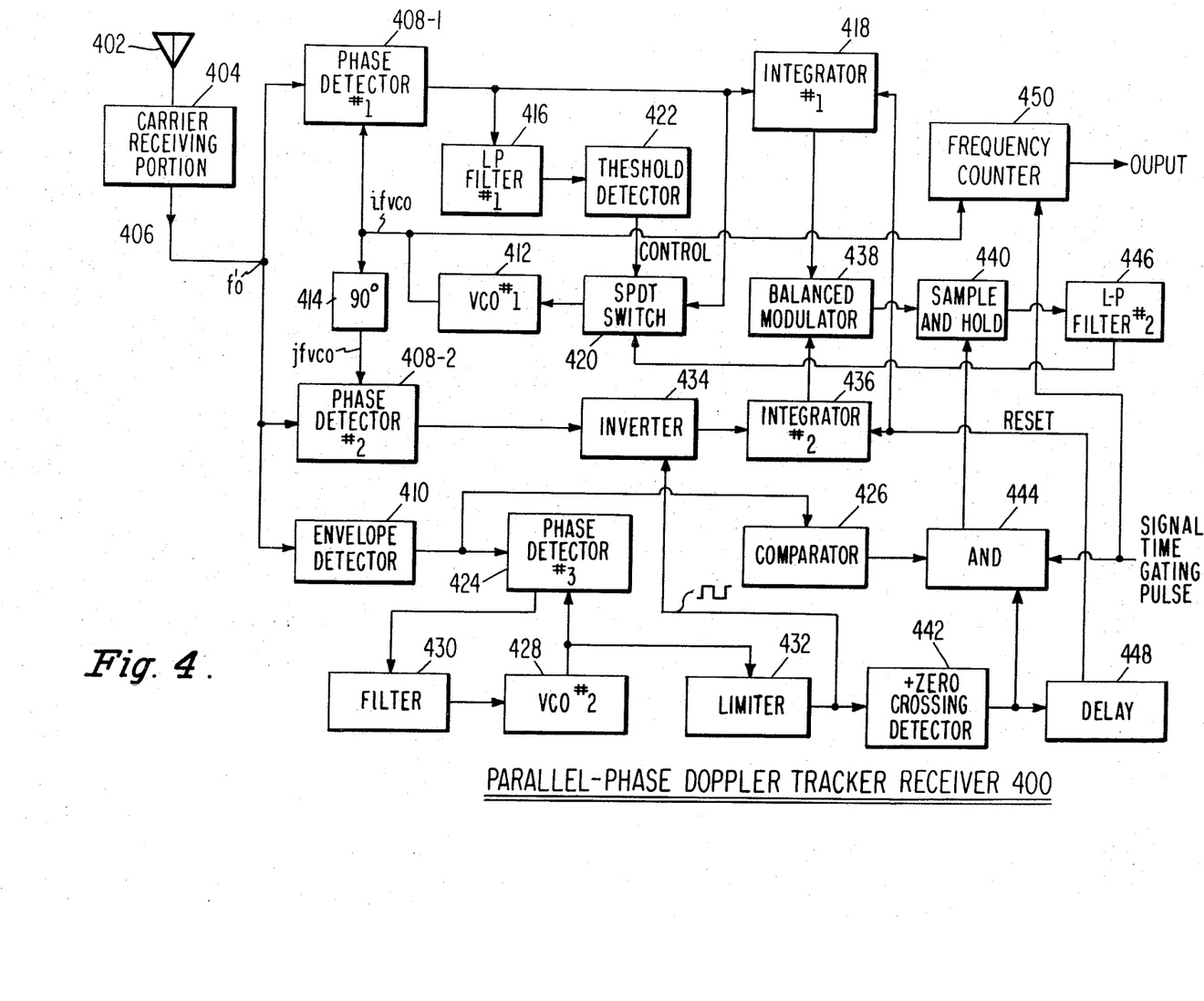
FIG. 4 is a block diagram of a parallel-phase doppler tracker receiver embodying the present invention.

FIG. 4 is a block diagram of a doppler tracker receiver embodying the present invention, which is capable of deriving a signal from a voltage-controlled oscillator (VCO) approaching the form of ideal graph 306 from a received signal having the form of actual graph 300. This VCO signal, in which granularity is reduced to a negligible level, is capable of providing a more precise measure of the value of the angle of $\theta$ than could be obtained in the presence of granularity.

As shown in FIG. 4, parallel-phase doppler tracker receiver 400 comprises conventional antenna 402 and carrier receiving station 404 for deriving a signal having off-set frequency $f_o'$ on output conductor 406 of carrier receiving portion 404. Carrier receiving portion 404 may include respective RF amplifiers, frequency converters and/or IF amplifiers responsive to received signals corresponding to $f_c'$ and $f_{REF}$ transmitted from the ground station. In any case, carrier receiving station 404 includes a mixer for mixing the two received signals to provide the difference off-set frequency $f_o'$ as the output signal on conductor 406.

This off-set frequency signal $f_o'$ on conductor 406 is applied as respective first inputs to phase detector 408-1 and phase detector 408-2. In addition, the off-set frequency signal $f_0'$ on conductor 406 is applied as an input to envelope detector 410. Envelope detector 410 detects an amplitude modulation component of $f_o'$, due to modulation of $f_{REF}$ and/or $f_c$ at the transmitter, to determine the beginning and end of each scan period. A detector, other than an envelope detector, for detecting a different type of modulation or a change in phase difference during flyback, could be substituted for envelope detector 410 to determine the beginning and end of each scan period.

The output signal of first VCO 412, which has a frequency $f_{VCO}$, is applied directly as a second input to phase detector 408-1 and through 90° phase shift circuit 414 to provide a frequency $jf_{VCO}$ as a second input to phase detector 408-2.

The output of phase detector 408-1 is applied as respective inputs to first low pass filter 416, first integrator 418 and SPDT switch 420. The output from first low pass filter 416 is applied as an input to threshold detector 422. Threshold detector 422, only in response to the amplitude of the output from first low pass filter 416 being greater than a given threshold value, provides a control input to switch 420. In response to the presence of this control input, switch 420 is switched to a condition in which the output voltage from first phase detector 408-1 is forwarded through switch 420 as a control voltage input to first VCO 412.

The output from envelope detector 410, is a signal having a frequency and phase corresponding to that of the scanning frequency $1/T$ of the pseudodoppler antenna array of the transmitter. This signal at the output of envelope detector 410 is applied as a first input to third phase detector 424 and as an input to comparator 426. Comparator 426 produces an output only when the absolute value of the input amplitude thereto exceeds a reference value, so that comparator 426 gives no output near the beginning and end of each scan period where phase discontinuities occur.

Second VCO 428 generates a continuous frequency signal which is applied as a second input to phase detector 424. The output of phase detector 424 is applied through narrow-band filter 430 as a control voltage input through second VCO 428. Thus, phase detector 424 and filter 430 form a phase-locked loop for synchronizing the phase and frequency of the continuous output signal from second VCO 428 with the scan frequency and phase manifested by the output from envelope detector 410.

The sinusoidal output signal from second VCO 428 is converted into a corresponding square-wave signal by limiter 432. The square-wave signal at the output of limiter 432 is applied as a control input to inverter 434. During each half-cycle of the square wave control voltage to inverter 434 having a given polarity, inverter 434 passes the output from second phase detector 408-2, without inversion, as an input to second integrator 436. During each half-cycle of the square-wave control input to inverter 434 having a polarity opposite to this given polarity, inverter 434 passes the output from phase detector 408-2, with inversion, as the input to second integrator 436.

The output from first integrator 418 is applied as a first input to balanced modulator 438 and the output of second integrator 436 is applied as a second input to modulator 438. The output from balanced modulator 438 is applied as a signal input to sample and hold circuit 440.

The square-wave output from limiter 432 is also applied as an input to +zero crossing detector 442, which generates a short pulse occurring between successive scan cycles. AND gate 444, only when enabled by the presence of a signal time gating pulse required as a control input thereto, forwards any output from comparator 426, applied as a first signal input thereto, and any output from +zero crossing detector 442, applied as a second signal input thereto, as a control input to sample and hold circuit 440. The polarity and/or level of the output from comparator 426 and the output from +zero crossing detector 442 are different from each other, so that sample and hold circuit 440, which incorporates a storage element, samples the output from balanced modulator 438 only during the presence of an output pulse from +zero crossing detector 442 on the control input to sample and hold circuit 440. The sample level from balanced modulator 438, which is held on the storage element of sample and hold circuit 440, is forwarded to second low pass filter 446 only during the presence of an output from comparator 426 on the control input to sample and hold circuit 440. Thus, low pass filter 446 receives no signal from sample and hold circuit 440 during the flyback period between successive scans during which sample and hold circuit 440 is sampling the output from balanced modulator 438. The output from low pass filter 446 is applied through SPDT switch 420, when switch 420 is in a second condition thereof, as the control voltage to first VCO 412.

The pulse output from +zero crossing detector 442, besides being applied to AND gate 444, is delayed by delay circuit 448 and then applied as a reset or dump input to both first integrator 418 and second integrator 436.

The output from first VCO 412, having frequency $f_{VCO}$, is applied as a first input to frequency counter 450, which has signal time gating pulses applied as a second input thereto. Each of the signal time gating pulses, which occur periodically, has a fixed predetermined duration which is many times larger than a cycle of signal $f_{VCO}$. Frequency counter 450 counts the number of cycles of signal $f_{VCO}$ which occur during each signal time gating pulse and, at the end of each gating pulse, manifests as a digital output the average frequency during the occurrence of the preceding signal gating pulse.

Considering now the operation of receiver 400, it will be assumed that initially the frequency $f_{VCO}$ of VCO 412 differs from the frequency $f_o'$ by a relatively large amount. Under such a condition, the rate at which the relative phases of the frequency $f_o'$ and $f_{VCO}$ change with respect to each other is large. Therefore, the output from both phase detectors 408-1, 408-2 will be relatively high. In particular, the output frequency from phase detector 408-1 will be too high to pass through low pass filter 416 and provide a signal of sufficient magnitude to overcome the threshold of detector 422. In this case, SPDT switch will remain unoperated and in that switch condition thereof wherein the output from phase detector 408-1 is fed back as the control voltage to VCO 412. This is the search or acquisition mode of receiver 400.

Since during each cycle of the output frequency from phase detector 408-1, the instantaneous amplitude of the control voltage applied to VCO 412 will vary in level over a given range, the resulting frequency $f_{VCO}$ of VCO 412 will also vary over a certain range which includes frequency $f_0'$. However, as soon as the frequency $f_{VCO}$ reaches the vicinity $f_0'$ the frequency of the output signal from phase detector 408-1 becomes sufficiently low to pass through low pass filter 416 and cause threshold detector 422 to apply a control signal to SPDT switch 420. In response thereto, switch 420 is operated to now forward the output from low pass filter 446 as the control voltage input of VCO 412. This is the tracking mode of receiver 400.

To help in understanding the tracking mode of receiver 400, reference will be made to the graph shown in each of FIGS. 5a-5i.

Figure 5A:
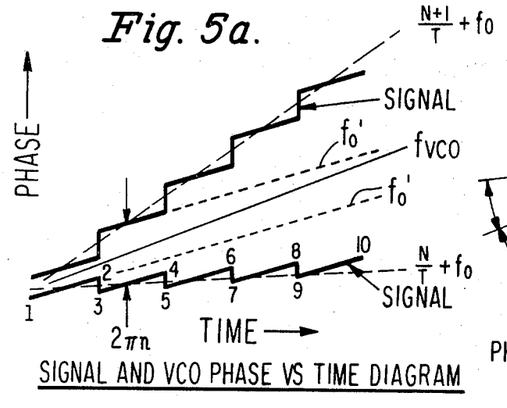
FIGS. 5a–5i are graphs helpful in explaining the operation of the parallel-phase doppler tracker receiver of FIG. 4.

FIG. 5a is a phase-time diagram. The two jagged lines both represent the phase of the actual signal present on the output conductor 406 from carrier receiving portion 404, including its undesired phase jump. The only difference between the upper and lower jagged lines is that the phase jumps shown in the upper jagged line exceeds the phase jump shown in the lower jagged line by $2\pi$ radians, since $2\pi$ radians is identically equivalent to zero radians, the signal shown by the upper jagged line is reducable to one identical with the signal shown by the lower jagged line. For the reason discussed in connection with FIG. 3, the slopes of both of these jagged lines during each of the successive forward scans manifests the frequency $f_0'$. However, the average slope of the upper discontinuous signal line manifests the frequency $(N + 1)/T + f_0$, and the average slope of the lower discontinuous signal line manifests the frequency $N/T + f_0$, where $N$ is an integer, $T$ is the scan period and $f_0$ is the off-set frequency shown in FIG. 2. The respective frequencies manifested by the slopes of the upper and lower discontinuous signal lines correspond to the two lines defining the major lobe of the frequency spectrum. The solid line in FIG. 5a manifests the frequency $f_{VCO}$ of VCO 412, which, as shown, initially differs somewhat in slope from the desired frequency $f_0'$.

Figure 5B:
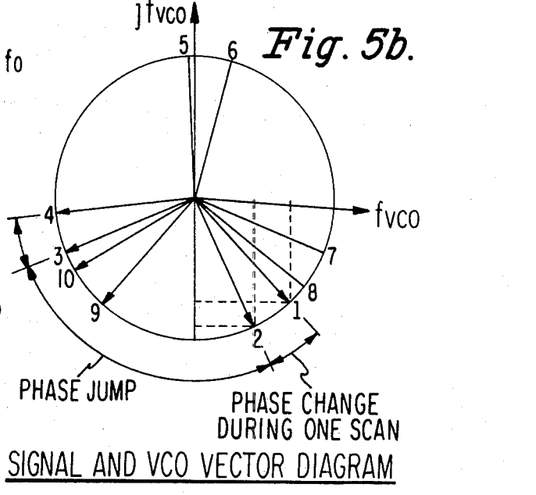

FIG. 5b represents the signals shown in FIG. 5a in vector form. The numbers correspond on the two diagrams. During time $T_1$, the first scan period, the signal vector advances from 1 to 2 during the forward scan portion thereof and then jumps from 2 to 3 during the flyback portion thereof. During time $T_2$, the second scan period, the signal advances the 3 to 4 during the forward scan portion thereof and then jumps from 4 to 5 during the flyback portion thereof, and so on. The vector $f_{VCO}$ manifests the output from VCO 412 applied as a second or reference input to phase detector 408-1 and the vector $jf_{VCO}$ manifests the output of 90° phase shifter 414 applied at a second or reference input of the phase detector 408-2.

The outputs of the respective phase detectors 408-1 and 408-2 may be found by projecting the points corresponding to the beginning and end of each scan through the horizontal and vertical axes corresponding to the $f_{VCO}$ and $jf_{VCO}$ vectors. By way of example, these projections are shown for points 1 and 2.

Figure 5C:
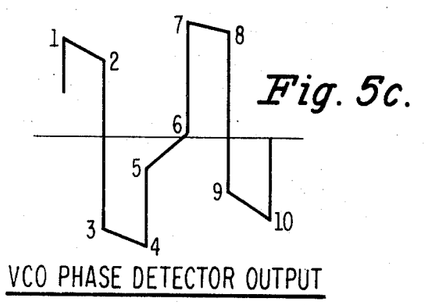
Figure 5D:
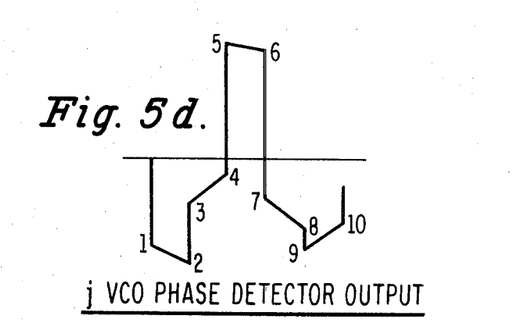

FIG. 5c illustrates the output from phase detector 408-1. This output is proportional to the amplitude of the component of the input signal which is in phase with frequency $f_{VCO}$ applied as a reference signal to phase detector 408-1. Similarly, FIG. 5d shows the output from phase detector 408-2, which is proportional to the amplitude of the component of the input signal which is in phase with $jf_{VCO}$ applied as a reference signal to phase detector 408-2.

Figure 5E:
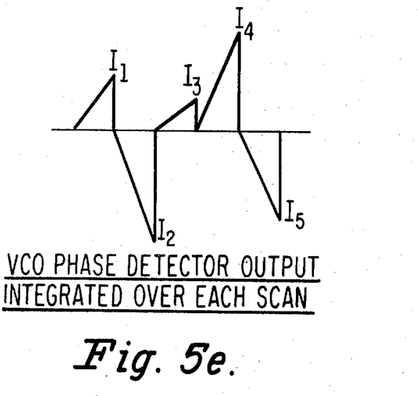

FIG. 5e represents the output of first integrator 418. The amplitude of line $I_1$ is proportional to the area under the trapezoid 1-2 in FIG. 5c, and so on for each scan. Note that the output from first integrator 418 is reset to zero at the end of each scan by a reset pulse applied thereto.

Figure 5F:
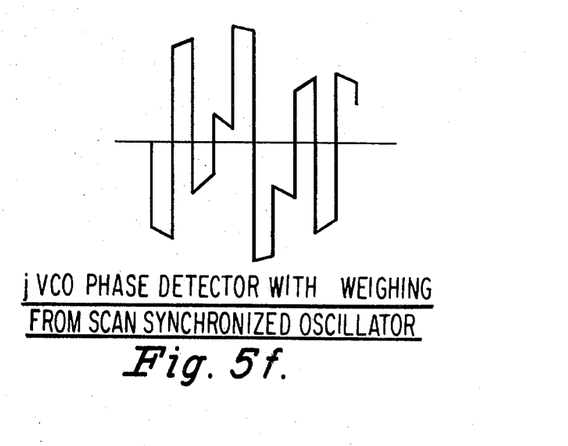

FIG. 5f represents the output of inverter 434. As mentioned earlier, the inverter is driven by the square wave from the output of limiter 432. The effect is to multiply the output of phase detector 408-2 by +1 for the first half of each scan period and by −1 for the second half of each scan period.

Figure 5G:
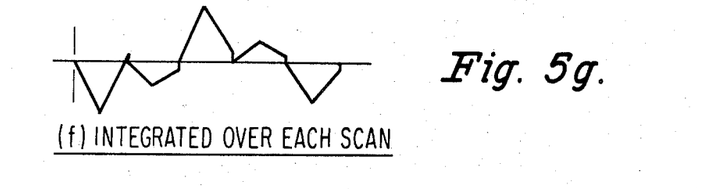

FIG. 5g is the output of second integrator 436. Integrator 436, which is also reset after each scan period shows the output of inverter 434 integrated over each successive scan period. If the frequency $f_{VCO}$ were exactly equal to that of $f_0'$, there would be no relative rotation of the signal vector with respect to the vectors $f_{VCO}$ and $jf_{VCO}$ during a scan period, and the outputs of phase detectors 408-1 and 408-2 would be rectangular waves. In this case, the pairs of inverted quarter-cycles from inverter 434 would be equal in amplitude and the output of second integrators 436 would be zero at the end of each scan period. Therefore, the actual level of the signal output from second integrator 436 present at the end of each scan period represents the amplitude of the phase error integrated over that scan period.

Figure 5H:
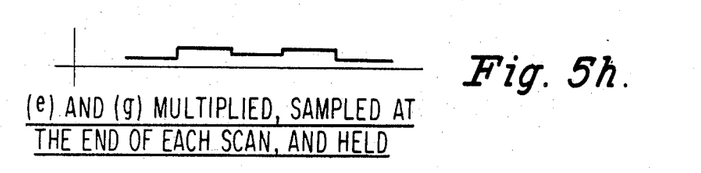
Figure 5I:
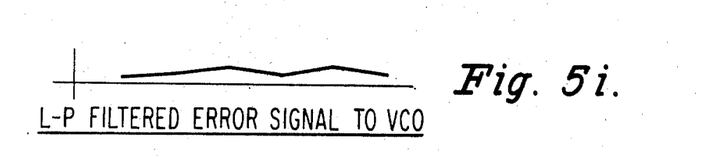

As shown in FIG. 4, the outputs from first and second integrators 418 and 436 are applied to balanced modulator 438, which multiplies them together, and the output from balanced modulator 438 is sampled at the end of each scan period in response to a pulse from +zero crossing detector 442 applied through AND gate 444 to sample and hold circuit 440. The result of this process is shown in FIG. 5h. The bipolar (AC) output of second integrator 436 is transformed into a unipolar (DC) error signal suitable for driving VCO 412 to the correct frequency after proper filtering. The filtered error signal, shown in FIG. 5i, at the output of second low pass filter 446 is fed back through SPDT switch 420 as the control voltage to VCO 412. This control voltage shifts the frequency of $f_{VCO}$ to diminish the error between $f_{VCO}$ anf $f_0'$. Further, as the DC amplitude of the error signal diminishes, the ripple also becomes smaller.

Thus, parallel-phase doppler tracker receiver 400, as its name implies, sets the slope of the phase of the VCO 412 equal to that of the forward scan of each scan period, manifesting the doppler signal $f_0'$, and ignores the phase discontinuities. Receiver 400 depends for its operation upon being able to determine the phase of the doppler scan from the actual received signal. This information can be extracted by envelope detector 410 from the amplitude modulation occurring during a scan, as discussed above. In the alternative, it can be obtained by detecting other types of modulation of the transmitted signal or, in the absence of any modulation of the transmitted signal, by detecting the phase discontinuities themselves.

In actual practice, a tracker receiver must often operate in a noisy radio transmission environment. Under such conditions, the use of receiver 400 is particularly advantageous, since the integration of the input signals applied thereto by each of first and second integrators 418 and 436 over substantially and entire scan period, followed by the momentary sampling of the accumulated signal at the end of each scan period, results in the averaging out of much of the received noise.

What is claimed is:

1. A doppler tracker receiver for receiving a doppler signal which at the end of each one of successively-occurring intervals exhibits a momentary phase discontinuity, said receiver comprising:
   a. a voltage-controlled oscillator for producing a controlled frequency,
   b. phase detection means coupled to said oscillator and responsive to said doppler signal applied thereto for deriving first and second outputs manifesting respectively the difference in phase between each of first and second phase-quadrature components of said controlled frequency and said signal,
   c. phase-discontinuity detection means responsive to said signal applied thereto for determining the end and middle of each successively-occurring interval to thereby divide each interval into two halves,
   d. a first integrator and first coupling means applying said first output of said phase detection means as an input to said first integrator,
   e. a second integrator and second coupling means controlled by the output of said phase-discontinuity detection means for applying the second output of said phase detection means with inversion as an input to said second integrator during one half of each interval and without inversion during the other half of each interval,
   f. signal translating means including a sample and hold circuit controlled by the output from said phase discontinuity detection means for sampling the algebraic product of the outputs from said first and second integrators at the end of each interval and immediately thereafter resetting said first and second integrators, and
   g. third coupling means between said sample and hold circuit and said voltage control oscillator to apply an error signal to said oscillator determined by the algebraic amplitude of the held sample signal from said sample and hold circuit.

2. The receiver defined in claim 1, wherein said third coupling means include a low-pass filter for filtering the held sample signal from said sample and hold circuit.

3. The receiver defined in claim 1, wherein said third coupling means includes a SPDT switch for forwarding said error signal determined by said held signal only when said switch is in one of its two conditions, and search mode means for forwarding one of said first and second outputs of said phase detection means as said error signal when said switch is in the other of its two conditions and for maintaining said switch in said other condition only in response to a parameter of one of said first and second outputs exceeding a given level.

4. The receiver defined in claim 3, wherein said parameter is frequency, and wherein said search mode means includes a low-pass filter responsive to one of said first and second outputs of said phase detection means and a threshold detector for controlling the condition of said switch to maintain said switch in its other condition only when the level of the signal passed by said low-pass filter to said threshold detector exceeds the threshold thereof.

5. The receiver defined in claim 1, wherein said signal translating means includes a balanced modulator for obtaining the algebraic product of the outputs from said first and second integrators.

6. The receiver defined in claim 1, wherein said doppler signal constitutes a periodic scan signal in which the length of each interval is equal to a scan period and said momentary phase discontinuity occurs during flyback at the end of each scan period, wherein said doppler signal includes an amplitude modulation manifesting the phase and frequency of said scan signal, and wherein said phase-discontinuity detection means includes an envelope detector responsive to said signal applied thereto for detecting said scan signal, a second voltage-controlled oscillator, a narrow-band phase-locked loop responsive to said detected scan signal for controlling the sinusoidal output of said second voltage controlled oscillator, a limiter for converting said sinusoidal output of said second voltage-controlled oscillator into a square wave isochronous therewith, means for applying said square wave as the inversion control to said second coupling means, a zero crossing detector having said square wave applied thereto for deriving a pulse at the end of each scan period, and fourth coupling means for applying a derived pulse to said sample and hold circuit to cause sampling thereby to take place.

7. The receiver defined in claim 6, wherein said phase discontinuity detection means further includes a comparator having the output of said envelope detector applied as an input thereto for deriving an output from said comparator only when the absolute value of the output thereto exceeds a reference level, whereby said comparator fails to produce an output only between scans where phase discontinuities occur, and wherein said fourth coupling means includes means for applying the output of said comparator to said sample and hold circuit to effect the holding of a sample only during the occurrence of an output from said comparator.

8. The receiver defined in claim 7, further including a frequency counter having said controlled frequency from said first-mentioned voltage-controlled oscillator applied as a first input thereto, means for applying as a second input to said frequency counter each of a series of periodic signal time gating pulses, each of said signal time gating pulses having a fixed predetermined duration many times larger than a cycle of said controlled frequency, whereby said frequency counter measures the number of cycles of said controlled frequency occurring during each signal time gating pulse, and wherein said fourth coupling means includes an AND gate controlled by said signal time gating pulses for forwarding the output of said comparator and the pulse from said zero crossing detector to said sample and hold circuit only during the occurrence of each signal time gating pulse.

* * * * *

UNITED STATES PATENT OFFICE
CERTIFICATE OF CORRECTION

PATENT NO. : 3,866,227
DATED : February 11, 1975
INVENTOR(S) : Abraham Eli Ruvin It is certified that error appears in the above-identified patent and that said Letters Patent are hereby corrected as shown below:

Column 3, line 39, change "$L/\mu T$" to read --$L/\lambda T$--

Signed and sealed this 10th day of June 1975.

(SEAL)
Attest:

RUTH C. MASON
Attesting Officer

C. MARSHALL DANN
Commissioner of Patents
and Trademarks